United States Patent [19]

Shah et al.

[11] Patent Number: 4,740,941
[45] Date of Patent: Apr. 26, 1988

[54] SYSTEM FOR ALIGNING SECTOR MARKS WITH DATA IN A DISK STORAGE SYSTEM

[75] Inventors: Prabodh L. Shah, Boulder; Paul M. Trethewey, Longmont, both of Colo.

[73] Assignee: Storage Technology Partners 11, Louisville, Colo.

[21] Appl. No.: 628,197

[22] Filed: Jul. 6, 1984

[51] Int. Cl.[4] .............................................. G11B 21/10
[52] U.S. Cl. ........................................ 369/48; 369/47; 369/60
[58] Field of Search .................... 358/342; 369/47, 48, 369/50, 111, 32, 30, 60, 59, 124, 44, 279; 365/234; 360/72.2, 48, 49

[56] References Cited

U.S. PATENT DOCUMENTS

| | | | |
|---|---|---|---|
| 4,094,010 | 6/1978 | Pepperl | 369/47 |
| 4,094,013 | 6/1978 | Hill | 365/234 |
| 4,366,564 | 12/1982 | Haan | 369/60 |
| 4,562,577 | 12/1985 | Glover | 371/38 |

Primary Examiner—Alan Faber
Attorney, Agent, or Firm—Woodcock Washburn Kurtz Mackiewicz & Norris

[57] ABSTRACT

A system for aligning data with corresponding sector marks in an optical disk storage system. In an optical disk storage system, data is written into a number of concentric bands, each of which contains a servo track and a number of data tracks. Each band is divided circumferentially into a series of sectors which are defined by marks in the servo track. The beginning of a sector is detected by identifying one of the marks in the servo track, and the beginning of a data record must coincide with the beginning of a sector. Recorded during the manufacture of the storage disk of the present invention, are pairs of special tracks wherein the first sector mark on a track is identified by an index mark, and the adjacent data track has a beginning of data mark recorded at a fixed location relative to the index mark. The disk read/write head is moved over one of these pairs and the difference in time between the occurrence of the index and occurrence of the beginning of data mark is measured. This difference in time is then fed to a delay circuit that electrically delays the sector pulse to coincide with the actual beginning of data. Because the beginning of data and the occurrence of a sector mark is measured with time, and because the relative velocity between the disk and the head is different if the head is located over an inner diameter of the disk as opposed to the head being located over an outer diameter of the disk, two measurements are made: one on an inner diameter and one on an outer diameter index track. The difference between these two measurements is used to extrapolate a sector mark to data time difference for each data band that occurs between the inner and outer diameter bands.

5 Claims, 7 Drawing Sheets

SYSTEM FOR ALIGNING SECTOR MARKS WITH DATA IN A DISK STORAGE SYSTEM

BACKGROUND OF THE INVENTION

This invention relates to disk data storage systems wherein data is stored in sectors of concentric tracks on a rotating disk. More particularly, the invention relates to a system and method for aligning the start of data with the beginning of a sector on such disk storage systems.

In a disk data storage system, regardless of whether such a storage system is a magnetic disk or an optical disk, data is written on or read from the surface as the disk rotates past read/write heads (the term "head" will be used in this disclosure to describe the device which senses the data during a read operation or causes the data to be written during a write operation). Data is typically recorded on the disk in concentric rings called tracks. In a high performance disk data storage system, each track is divided in to a number of segments called sectors. Such sectors provide an identifiable area on the disk where data may be stored and indexed for future retrieval. Data may be stored entirely in a sector, or start at one sector and continue through several sectors. Before a read or write operation can be initiated, the head must be positioned over the desired track, and the disk must be rotated until the desired sector of the selected track is positioned under the head.

The read/write heads are positioned at the correct track by means of a servo system. There are many types of head positioning servo systems known in the art, any one of which could be used with the present invention. There are also may types of Sector positioning systems that could be used to locate the correct sector before reading or writing begins. One such system is described in copending application Ser. No. 472,436 filed Mar. 7, 1983, and assigned to the same assignee as is this application.

When a disk data storage system is writing new data on a disk, the precise location where this data should begin must be accurately determined. When the disk data system is reading data, it also must know the precise location where the disk data is to begin if it is to accurately interpret what is read from the disk. In lower density disk data storage systems, for example floppy disk systems, data starts at a point on the disk called an index. An index defines the start of a circular track as well as the end of the data on that track. In these low density data storage systems data is written consecutively on each track with a gap between each record, and because of the low performance requirements of this type of device, segments are not used. As the performance requirements, such as storage capacity and access time increase, the track must be subdivided into sectors so that data located at various points on the track can be more readily accessed without tying up controller or processing unit resources necessary to search for gaps. The higher density and the division into sectors increases the requirement to determine the exact point where the data starts in each segment.

Where the track is not divided into segments, as in the floppy disk discussed earlier, the beginning of data occurs at the index and thereafter data or gaps are continuous throughout the track. In these low density systems, a long preamble consisting of clocking bits starts near the index and the actual data begins at the end of the clocking bits. Since the index detector and data read/write head are different, the index and start of data may not coincide, however, because of the low performance requirements, mechanical alignment and the use of the preamble, this difference is not significant. In higher density magnetic disk storage systems, data is stored on many recording surfaces arranged as a stack of recording platters much like a stack of phonograph records. In this type of system the tracks are divided into sectors and the sector boundaries are defined on a separate platter known as the servo platter or servo track usually the bottom platter of the stack. There is an individual head for each recording surface, and the heads are all connected together to move in unison. As the heads are positioned over a given location, all tracks are accessible including the servo track, therefore the sector location information recorded on the servo track is used to define sectors on all the other tracks. This system does have an alignment problem between the detection of the start of a sector on the servo platter and the actual start of data on one of the other recording heads. However, another feature of this type of system, the manufacture of the recording heads and the platters as a single unit called a head-disk assembly or HDA, reduces this problem significantly. Since the recording surfaces and the heads that read or write data are always kept as a single unit, a mechanical alignment can be made when the system is manufactured and no alignment is required thereafter. Also, data will always be read by the same head and platter combination that originally wrote the data, further reducing the alignment problem.

As data density increases and with the use of removable media on high density systems, such as an optical disk data storage system, the need for a very precise alignment between the start of a sector and the start of the data in that sector becomes more acute. In an optical disk data storage system that stores over four billion characters on a single surface of a single platter, the density is so high that mechanical alignment alone is insufficient, and electrical alignment must also be performed. With interchangeable media, that is where the data storage disk can be removed from the one disk drive and inserted in another disk drive at a later time, the alignment need is so great that alignment must be performed dynamically each time a disk platter is inserted into a drive. Also, with high density recording on a rotating disk, the alignment changes significantly between the inner diameter of the disk, where the relative motion between the head and the disk is slower, and the outer diameter of the disk, where the relative motion between the disk and the head is much faster.

There exists a need in the art, therefore, for an improved system for aligning the sector boundaries with the start of data within a sector. There is also a need in the art for such a system that can perform the alignment electrically, and also perform the alignment dynamically each time a new disk is inserted into the disk drive. There is a further need for an alignment system that can compensate for the difference between the beginning of a sector and the beginning of data at the inner diameter of a disk, and change this compensation at the outer diameter of a disk. The present invention satisfies these needs.

SUMMARY OF THE INVENTION

It is an object of the present invention to provide a system for aligning sector marks with data that overcomes the aforecited disadvantages associated with prior art alignment systems. More particularly, it is an object of the present invention to provide a system for aligning sector marks with data that measures the misalignment between the beginning of a sector and the beginning of data using prerecorded calibration tracks each time a new disk is inserted into the data storage device.

It is a further object of the present invention to provide such a system that stores this time delay and dynamically adjusts the electrical start of a sector to correspond with the start of data.

It is another object of the present invention to measure the time difference between the start of a sector and the start of data at the inner diameter of the disk, measure the time difference between the start of a sector and the start of data at the outer diameter of the disk, determine the time difference for all areas in between, and adjust the electrical start of sector mark dynamically as the head position moves between the inner and outer diameters of the disk.

The above and other objects, features, and advantages of the present invention are realized with a system wherein sector marks and data are stored in a plurality of concentric bands on one surface of a rotating disk storage medium. The storage medium also has recorded thereon a plurality of pairs of index data tracks, at least one pair on either side of the data bands, with each pair including an index track having an index location mark at a first sector location thereon and a home-address data track having a beginning of data in a fixed relationship to the index location mark. When a new disk storage medium is inserted into the data storage device, the read/write head is moved to one of the pairs of index data tracks on the inner diameter of the disk, and the time difference between the index, which is also the start of the first sector, and the beginning of the data is measured and stored. The disk storage device then moves the head to one of the pairs of index data tracks at an outer diameter and makes the same measurement. The disk storage device then determines the equivalent time difference for each data band between these two pair of index data tracks. As the disk head is moved to any given data band, the appropriate time difference for this band is inserted into a delay circuit that electronically delays the start of each sector pulse so that it coincides with the location of the beginning of data.

BRIEF DESCRIPTION OF THE DRAWINGS

The above and other objects, features, and advantages of an present invention will be more apparent from the following more particular description thereof, presented in conjunction with the following drawings wherein.

DETAILED DESCRIPTION OF THE INVENTION

The following description is of the best presently contemplated mode of carrying out the invention. This description is not to be taken in a limiting sense, but is made merely for the purpose of describing the general principles of the invention. The scope of the invention should be determined with reference to the appended claims.

Figure 1:
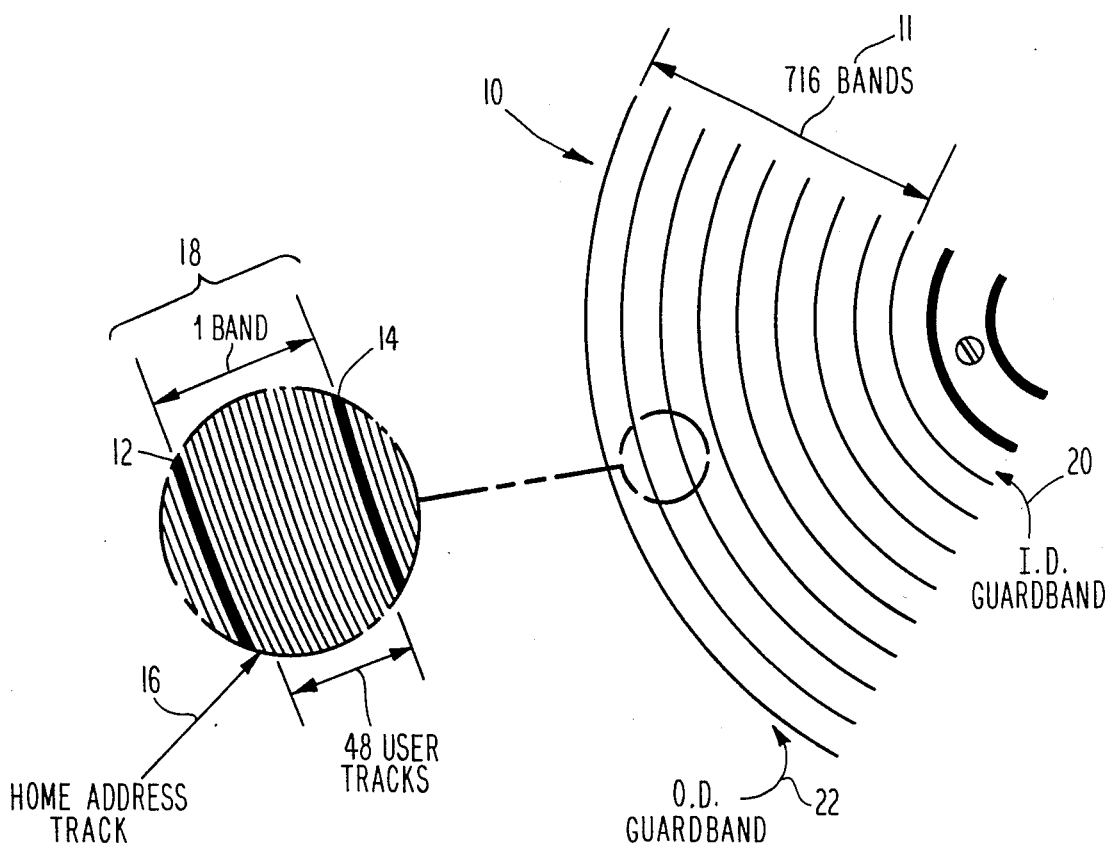
FIG. 1 is a partial top plan view of an optical disk or recording medium of the type used within the optical storage system of the present invention, and includes an expanded view of a portion of the surface of the disk to illustrate how the data bands are arranged thereon.

The invention is best understood by referring to the drawings, wherein like numerals are used to refer to like parts throughout. Referring first to FIG. 1, a portion of an optical storage disk surface 10 is illustrated. This disk 10 is divided into a large number of concentric data bands 11 comprising a plurality of data tracks into which data may be stored. Concentric coarse servo tracks separate one data band from another. Two such coarse servo tracks 12 and 14 are illustrated in the enlarged portion of FIG. 1. A first data track 16, adjacent to the coarse servo track 12, is written on the disk during the manufacture thereof and is used to identify the location number of the data band 18. This first data track in the data band is referred to as the "home-address track". As will be shown later, a home-address track occurs in a guardbound as well as a data band. As illustrated in FIG. 1 the data band 18 contains a large number of data tracks. In the preferred embodiment, 49 tracks, including the home-address track 16, are included in a data band. Further, there are 716 such data bands included on a given disk 10. In addition to the 716 data bands there is an inside diameter (ID) guardband 20 located inside all the data bands, that is, toward the center of the disk from the data bands, and an outside diameter (OD) guardband 22 located outside all the data bands. The ID guardband 20 and the OD guardband 22 contain a series of index bands each of which has index and home-address information used to calibrate the timing between the sector mark and the data of the present invention.

Figure 2:
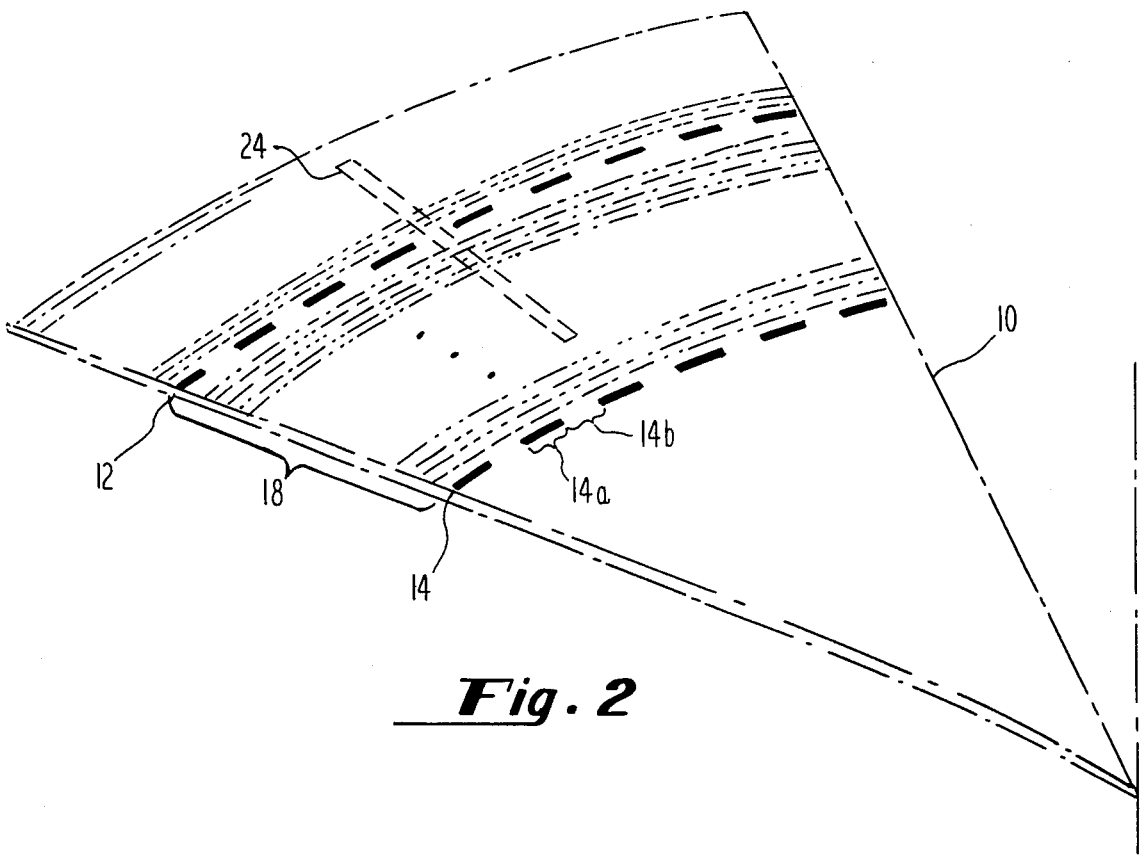
FIG. 2 is an expanded view of a segment of the optical disk surface and conceptually illustrates the pattern in the coarse servo tracks.

FIG. 2 shows a more detailed representation of a portion of the disk 10. In a preferred embodiment, the reflectivity pattern selected for the coarse servo tracks is a repetitive on/off scheme such that the coarse servo track appears as a dashed line, as illustrated by the coarse servo track 12 and the coarse servo track 14. A small segment 14A of the coarse servo track 14 is written during the manufacturing process, causing a low reflectivity condition to exist. This low reflectivity segment 14A is followed by segment 14B where no coarse servo track is written, causing a high reflectivity condition to exist. (In the preferred embodiment, the optical disk 10 exhibits high reflectivity if not written upon and low reflectivity if written upon. This situation could, of course, be reversed without altering the basic operating principles of the present invention.) As the disk 10 is rotated at a constant angular velocity, the coarse servo track illuminated in the coarse seek beam 24 will alternately reflect high and low amounts of radiation. Hence, the reflected radiation from the coarse servo track assumes a periodic pulse pattern having a known frequency. In the preferred embodiment of the present invention, the optical disk rotates at a speed of 1313 RPM, which speed is tightly controlled to within a tolerance of ±0.5 percent by a conventional speed-control servo system. With the disk rotating at this speed, the frequency associated with the reflectivity pattern of the coarse servo tracks is 175.6 KHZ. The coarse seek beam 24 is of such a dimension that as the head moves toward the center or toward the outside of the disk, this line area will always illuminate at least one coarse servo track. This coarse seek beam 24 detects the dashed line coarse servo track to indicate a sector mark. Two such sector marks, that is two reflective and two non-reflective areas combined equal one sector, and the platter is divided into 4,009 equa-angular sectors.

Figure 3:
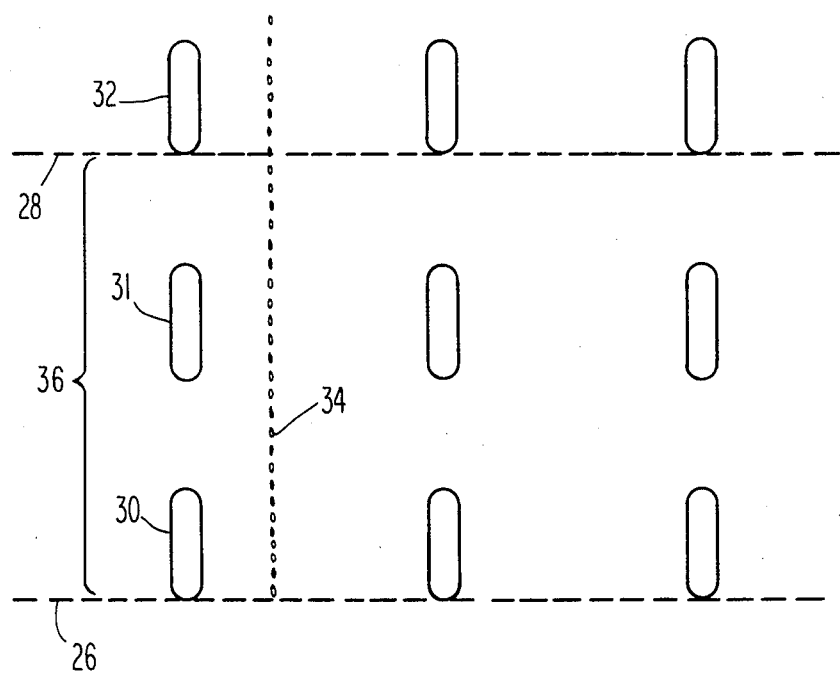
FIG. 3 illustrates the sector marks and the relationship between the sector marks and the start of data in the bands of the disk storage medium.

FIG. 3 is an enlarged portion of the disk 10 showing the data band 18 and the coarse servo tracks 12 and 14. The coarse servo tracks 12 and 14 are illustrated as a series of marked and unmarked areas. The dashed lines 26 and 28 delineate one sector, with the beginning of the sector occurring at the mark 30 and ending at the start of the mark 32. Data written into one of the tracks of the band is illustrated by the small segmented line 34, and as shown in FIG. 3, the beginning of data coincides with the beginning of the sector. Generating the beginning of the data 34 to coincide with the dash line 26, which is the beginning of the sector 36, is the subject of the present invention.

Figure 3A:
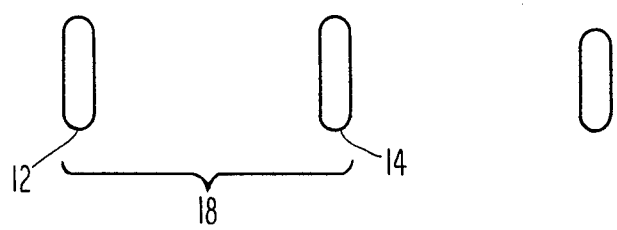
FIG. 3A illustrates the index mark and beginning of data mark in an index band.
Figure 3A:
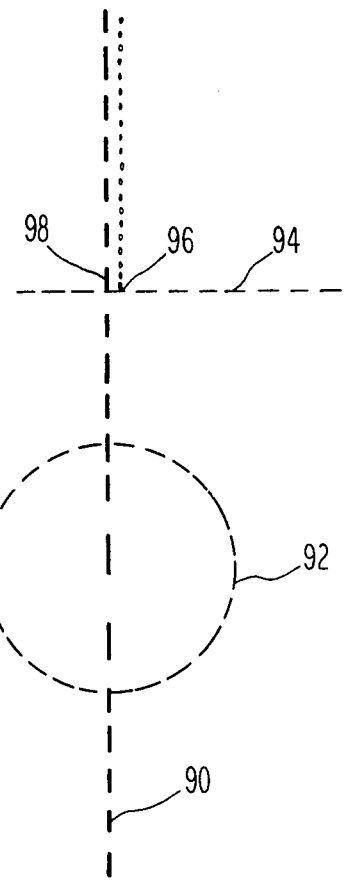

FIG. 3A is a portion of the disk 10 showing an index band. A coarse servo track 90 has an index mark shown as elongated sector marks illustrated in the dashed circle 92. This index mark defines the start of a band to occur six sector marks after the elongated sector marks and is more fully described in copending application Ser. No. 628,195 filed July 6, 1984, now abandoned, and assigned to the same assignee as is the application. The start of a band is indicated be the dashed line 94. A beginning of data mark 96 is written in each index band to coincide with the sector mark 98 that occurs at the start of the band. The sector mark 98 and beginning of data mark 96 in the index band are used in the present invention to align the corresponding sector mark and beginning of data in the data bands.

Figure 4:
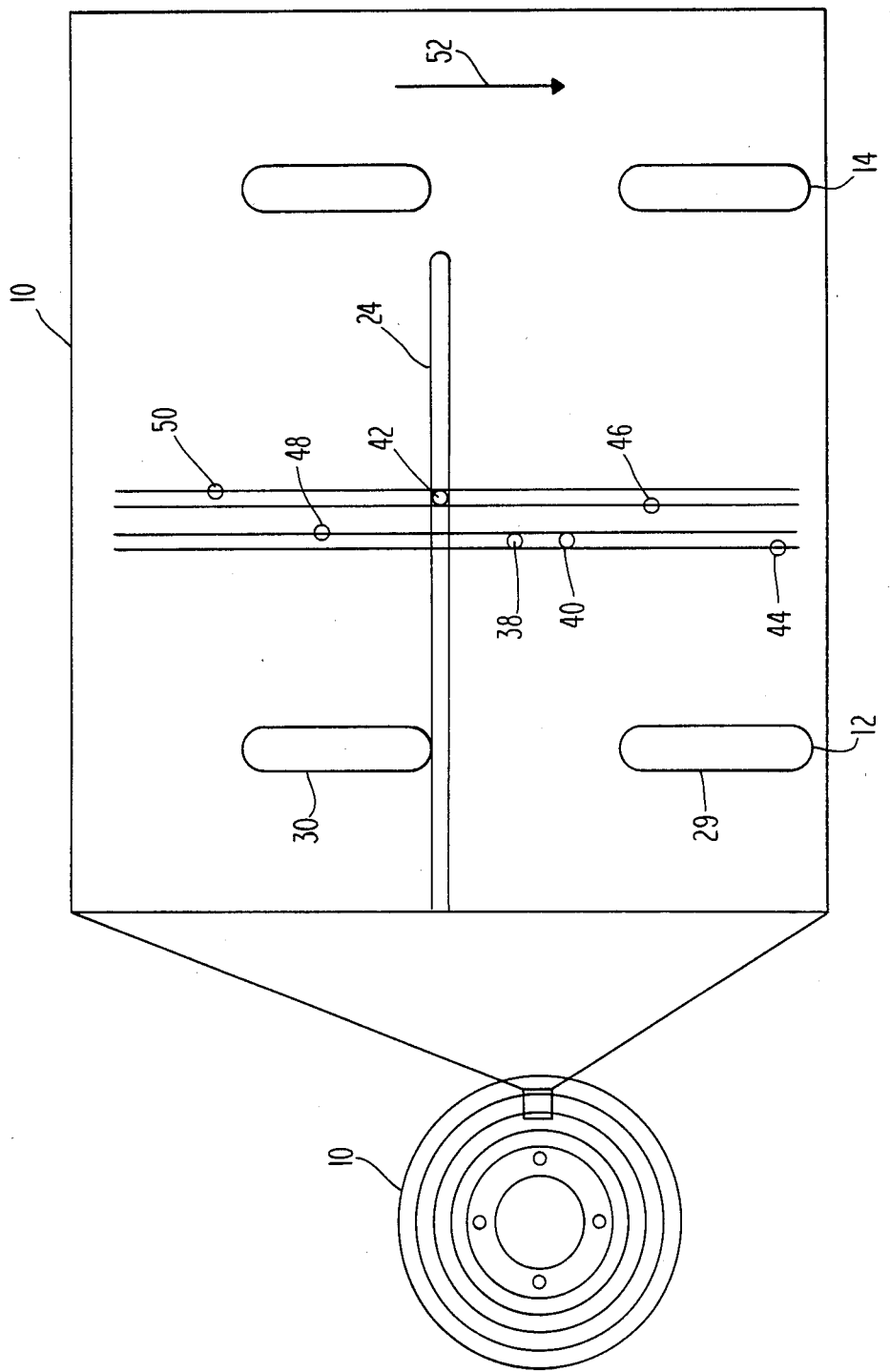
FIG. 4 shows the sector marks and two data tracks of one band of the optical storage medium and shows the relationship of the various read and write laser radiation beams as projected onto the disk surface.

Referring next to FIG. 4, and enlarged view of the disk 10 showing the coarse servo tracks 12 and 14 and showing the laser radiation beam pattern used to detect the coarse servo tracks and to read and write data on the disk 10 is shown. The disk storage medium is rotating in the direction indicated by arrow 52. The laser-optics of the optical disk data storage device generate eight laser radiation beams on the disk surface 10. These beams form a "spot pattern" consisting of six read beams, a write beam, and a coarse seek beam. The coarse seek beam 24 is used to detect the sector marks 29 and 30 and to define the beginning of a sector. The other seven beams in the spot configuration consist of a write beam 38, a readback check beam 40, a read beam 42, and four tracking beams 44, 46, 48, and 50, used to align the read/write and readback check beams on the correct track. The distance between the readback check spot 40, and the coarse seek beam 24, in the preferred embodiment, is approximately 25 micrometers. Since in the preferred embodiment the minimum spot size for a data bit is 0.95 micrometers, over 25 bits of information could be misaligned if the beginning of a sector mark is not delayed to allow for this distance.

The purpose of the present invention is to electrically delay the sector mark signal, generated by the detection of the start of the sector mark 30 by the coarse seek beam 24, to allow the disk surface to move the 25 micrometers so that the beginning of data coincides with the beginning of a sector mark. In order to calculate the actual delay involved, since the rotation speed of the disk can vary ±5.0 percent, upon loading of a new disk 10 into the data storage device, the head is moved to one of the ID guardband index bands. The ID guardband index bands, which are prewritten when the disk is manufactured, are arranged such that the coarse servo track of the index band also has embedded therein an index mark which corresponds to the beginning of the first sector on the track. The home-address track of the index band, which is also prewritten when the disk is manufacture, has the beginning of data precisely aligned with the beginning of the first sector. After moving the head over this guardband, a difference in time between the detection of the index by the coarse servo beam 24, which occurs at the first sector, and the detection of the beginning of data when the readback check spot 40 first encounters data, can be measured. This measure is a time measurement, however, between the time of the occurrence of the index and the time of the occurrence of the beginning of data and not a measurement of the distance between the two. Therefore, since the relative speed between the disk and the head at the outer diameter of the disk is 1.5 times the relative speed between the disk and the head at the inner diameter of the disk, this measurement must be repeated in the OD guardbands. Once the measurements for the ID guardband and the OD guardband have been made, and extrapolation of the delay time for every band in between can be made. After the delay time for each band is known, the occurrence of a sector mark pulse can be electrically delayed to cause the occurrence of the pulse to coincide with the physical beginning of data in each sector of the band.

Figure 5:
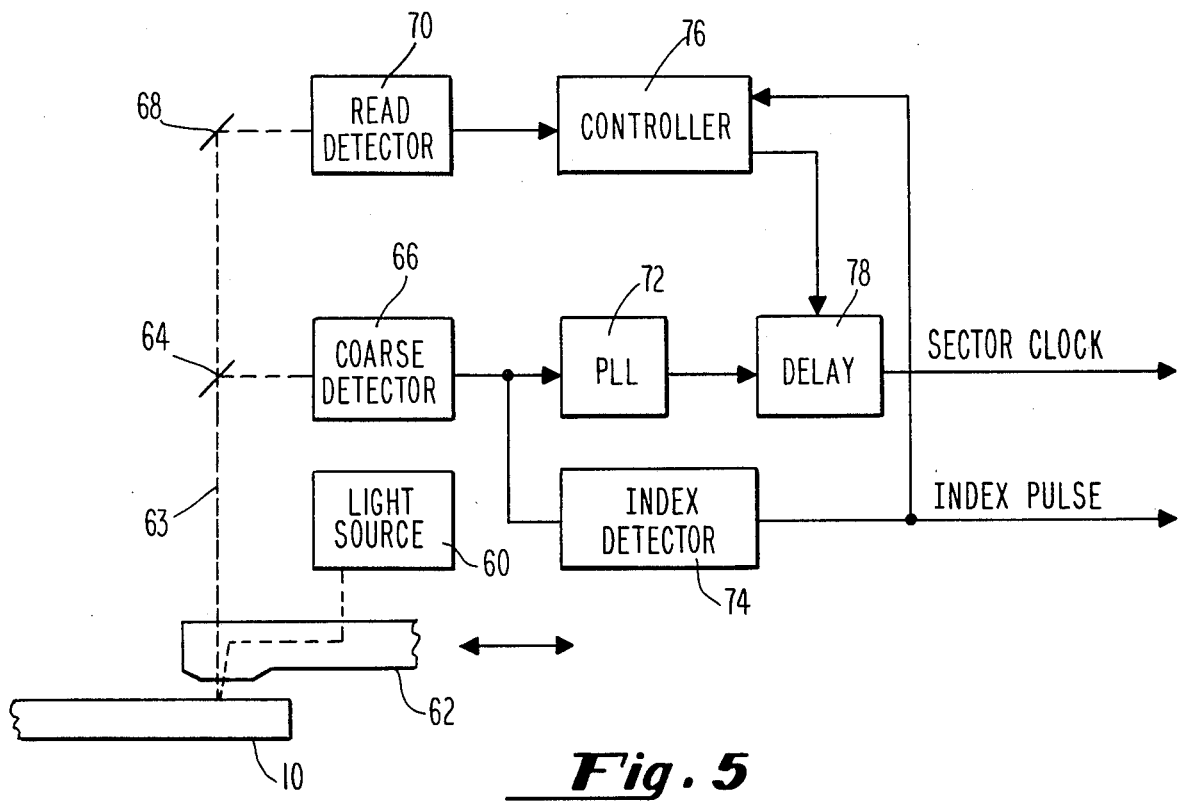
FIG. 5 is a block diagram of the present invention showing the components thereof.

FIG. 5 illustrates a block diagram of the preferred embodiment of the present invention. A light source 60 generates the laser radiation beam which causes the spot pattern illustrated in FIG. 4. This spot pattern passes through the read/write head 62, to shine on the disk 10. The reflected beam 63 is split at the beam splitter 64 where the coarse servo beam is directed to the coarse detector 66. The other seven beams are reflected off the mirror 68 to the read detector 70. The coarse detector 66 converts the light beam into an electrical signal which is fed to the voltage controlled oscillator circuit 72 and also fed to the index detector circuit 74. The index detector circuit 74 detects the occurrence of an index mark on the servo track, which coincides with the beginning of the first sector on the track, and sends an index pulse to the controller 76. The phase locked loop (PLL) circuit 72 is synchronized with the occurrence of the sector marks and sends a pulse to the delay circuit 78 upon the occurrence of each sector mark. The controller circuit 76 receives the index pulse from the index detector 74 and begins counting time until data is detected by the read detector circuit 70. The controller circuit then injects this time difference into the delay circuit 78 which delays the output of the phase locked loop (PLL) circuit 72 to cause the sector clock pulse to coincide with the beginning of data. Those skilled in the art will recognize that there are several methods of delaying a digital signal, any one of which could be used in the present invention. Those skilled in the art will also recognize that the controller circuit 76 could be implemented using a conventional microprocessor.

The controller circuit 76 directs the head 62 to move to the ID guardband to make the ID guardband sector mark to data measurement. The controller circuit 76 thus implemented using a conventional microprocessor includes a means for measuring the time differences between the occurrence of a sector mark and the beginning of data, as well as a means for storing the measured time differences and further directs the head 62 to move to the OD guardband to make the OD guardband sector mark to data measurement. After these two measurements are made, the controller circuit 76 uses the measurements to calculate a delay for each data band between the ID guardband and the OD guardband. As the head 62 is moved to a given data band, the correct delay for that band is injected into the delay circuit 78 to delay the sector clock pulse the correct amount of time for the given data band.

Figure 6:
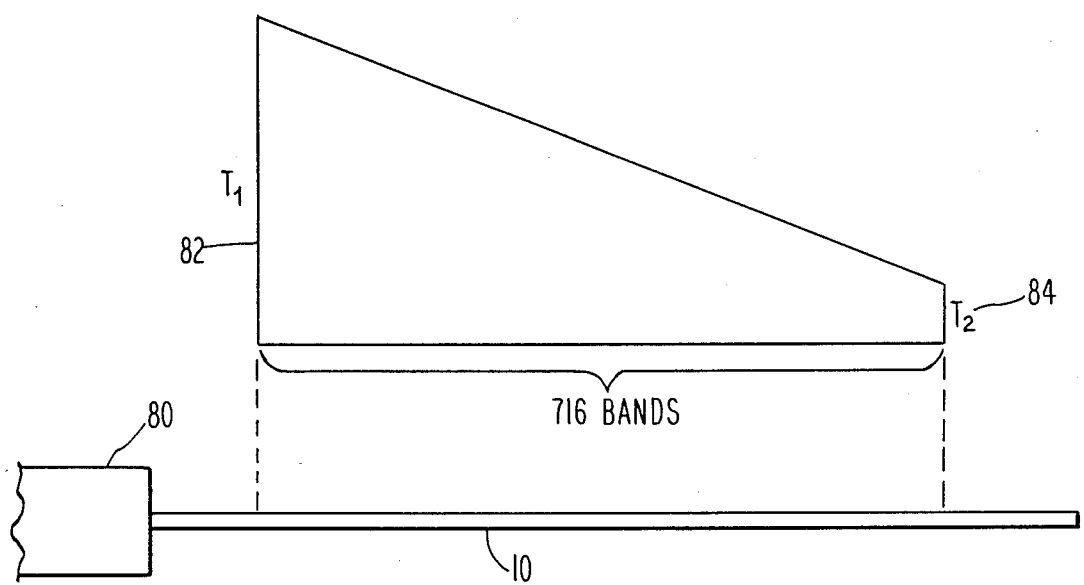
FIG. 6 shows the sector mark to data time difference relationship between the inner diameter bands and the outer diameter bands.

FIG. 6 illustrates the time difference between the sector mark and the beginning of data at the inner diameter of the disk and the outer diameter of the disk. The disk 10 is rotated by hub 80 to create relative motion between the read/write head and the disk. Because the relative speed between the head and the disk when the head is located over the inner diameter of the disk is slower, the time $T_1$ between the sector mark and the beginning of data, as illustrated at 82, is longer than the time between the sector mark and the beginning of data at the outer diameter of the disk as illustrated by $T_2$ 84. The time between the sector mark and the beginning of data for any band in between the ID guardband and the OD guardband can be calculated since the change in time is linear. The time delay for any given band is determined, through the controller circuit 76 implemented using a conventional microprocessor, by subtracting the time for the outer diameter band $T_2$ from the time for the inner diameter band $T_1$, dividing this time by the number of bands, multiplying the result times the relative band number and adding the time $T_2$ to the result of this calculation.

While the invention herein disclosed has been described by means of a specific embodiment and application thereof, numerous modifications and variations could be made thereto by those skilled in the art without departing from the spirit and scope of the present invention. Accordingly, it is to be understood that within the scope of the appended claims, the invention may be practiced otherwise than as specifically described herein.

What is claimed is:

1. In a disk storage system wherein data is stored in a plurality of concentric data bands on one surface of a rotating disk storage medium, said medium having information prerecorded thereon during the manufacture thereof including a servo track in each of said data bands, said servo track including a plurality of sector marks, a plurality of index bands, at least one index band located on either side of said data bands, said index bands including an index track having a plurality of sector marks and an index mark located at a first sector mark thereon, and said index bands further including a home-address data track having a beginning of data mark located in a fixed relationship to said index mark on said index track, a system for aligning said servo track sector marks with said data comprising:

means for detecting a first index mark in a first index band on a first side of said data bands;

means for detecting a first beginning of data mark in said first index band;

means for measuring a first time difference between said first index mark and said first beginning of data mark;

means for storing said first time difference;

means for detecting a second index mark in a second index band on a second side of said data bands;

means for detecting a second beginning of data mark in said second index band;

means for measuring a second time difference between said second index mark and said second beginning of data mark;

means for storing said second time difference;

means for determining a relative data band time difference, proportional to the difference between said first and second time differences, for each data band between said first index data band and said second index data band; and means for delaying said sector marks of said servo track in each data band an amount equal in time to said relative data band time difference corresponding to said data band;

whereby said first time difference between said first index mark and said first beginning of data mark is measured and stored, said second time difference between said second index mark and said second beginning of data mark is measured and stored, a time difference for each data band between said index data tracks is then determined and the corresponding time difference for a given data band is used to delay the sector marks in said data band to correspond to the beginning of data for said data band whenever data is being read or written in said data band.

2. The system for aligning sector marks with data as defined in claim 1 wherein said means for determining a relative data band time difference for each data band comprises:

means for subtracting said first time difference from said second time difference to create a relative time difference;

means for dividing said relative time difference by the number of said data bands to create a per band difference;

means for multiplying said per band difference by a relative band number for a data band to create a data band time difference; and means for adding said first time difference to said data band time difference to create said relative data band time difference.

3. In a disk data storage system wherein sector marks and data are stored in a plurality of concentric data bands on one surface of a rotating disk storage medium, a system for aligning said sector marks with said data in each said data band comprising:

a servo track located in each data band, placed on the storage medium during the manufacture thereof, containing a plurality of sector marks;

an index servo track, placed on the storage medium during the manufacture thereof, having a plurality of sector marks and an index mark located at a first sector mark;

a home-address data track, placed on the storage medium during the manufacture thereof, having a beginning of data mark in a fixed relationship to said index mark on said index servo track;

means for detecting said index mark;

means for detecting said beginning of data mark in said home-address data track;

means for measuring a time difference between said index mark and said beginning of data mark;

means for storing said time difference between said index mark and said beginning of data mark; and means for delaying said plurality of sector marks in each servo track an amount of time equal to said time difference;

whereby said time difference between said index mark and said beginning of data mark is measured and stored in said storage means and thereafter said sector marks are delayed to coincide with said beginning of data.

4. In a disk storage system wherein data is stored in a plurality of concentric data bands on one surface of a rotating disk storage medium, said medium having information prerecorded thereon during the manufacture thereof including a plurality of servo tracks, one servo track in each data band, each servo track containing a plurality of sector marks, an index servo track having a plurality of servo marks and an index mark located at a first sector mark thereon, and a home-address data track having a beginning of data mark in a fixed relationship to said index mark of said index servo track, a system for aligning said sector marks with said data in each said data band comprising:

means for detecting said index mark;

means for detecting said beginning of data mark in said home-address data track;

means for measuring a time difference between said index mark and said beginning of data mark;

means for storing said time difference between said index mark and said beginning of data mark; and means for delaying said plurality of sector marks an amount of time equal to said time difference;

whereby said time difference between said index mark and said beginning of data mark is measured and stored in said storage means and thereafter said sector marks are delayed an amount of time equal to said time difference to coincide with said beginning of data.

5. In a disk storage device wherein data is stored in a plurality of concentric data bands on one surface of a rotating disk storage medium, said medium having information prerecorded thereon during the manufacture thereof including a plurality of servo tracks, one servo track in each data band, each servo track containing a plurality of sector marks, and a plurality of index data bands, at least one band located on either side of said data bands, each index band including an index track having a plurality of sector marks and an index mark located at a first sector thereon, each index band further including a home-address data track having a beginning of data mark in a fixed relationship to said index mark, a method for aligning said sector marks with said data comprising the steps of:

detecting a first index mark in a first index band on a first side of said data;

detecting a first beginning of data mark in said first index band;

measuring a first time difference between said first index mark and said first beginning of data mark;

storing said first time difference;

detecting a second index mark in a second index band on a second side of said data;

detecting a second beginning of data mark in said index band;

measuring a second time difference between said second index mark and said second beginning of data mark;

storing said second time difference;

subtracting said first time difference from said second time difference to create a relative time difference;

dividing said relative time difference by a number of said data bands to create a per band difference;

multiplying said per band difference by a relative band number for each of said data bands to create a data band time difference for each data band;

adding said first time difference to said data band time difference to create a relative data band time difference; and delaying said sector marks of each data band an amount equal in time to said relative data band time difference corresponding to said data band.

* * * * *